United States Patent [19]

Sidman

[11] Patent Number: 4,536,809
[45] Date of Patent: Aug. 20, 1985

[54] ADAPTIVE MISPOSITION CORRECTING METHOD AND APPARATUS FOR MAGNETIC DISK SERVO SYSTEM

[75] Inventor: Michael Sidman, Colorado Springs, Colo.

[73] Assignee: Digital Equipment Corporation, Maynard, Mass.

[21] Appl. No.: 376,972

[22] Filed: May 10, 1982

[51] Int. Cl.³ ............................................. G11B 21/10
[52] U.S. Cl. ...................................................... 360/77
[58] Field of Search ............... 360/75, 77, 78; 369/43; 318/594, 600, 632

[56] References Cited

U.S. PATENT DOCUMENTS

| | | | |
|---|---|---|---|
| 3,404,392 | 10/1968 | Sordello | 360/77 |
| 3,881,184 | 5/1975 | Koepcke et al. | 360/78 |
| 3,994,016 | 11/1976 | Moghadam | 360/77 |
| 4,087,842 | 5/1978 | Manly | 360/77 |
| 4,135,217 | 1/1979 | Jacques et al. | 360/77 |
| 4,136,365 | 1/1979 | Chick et al. | 360/78 |
| 4,208,679 | 6/1980 | Hertrich | 360/77 |
| 4,371,960 | 2/1983 | Kroiss | 360/77 |
| 4,419,701 | 12/1983 | Harrison et al. | 360/77 |

FOREIGN PATENT DOCUMENTS 0009087 4/1980 European Pat. Off. .

OTHER PUBLICATIONS

Patent Abstracts of Japan, V. 3, No. 40, Apr. 6, 1979, p. 152E102 & JP.A-54-19718, "Locating System of High Accuracy".
Patent Abstracts of Japan, V. 4, No. 18, Feb. 13, 1980, p. 75E171 & JP.A-54-158206, "Servo-Information Recorder of Magnetic Disc Memory".
IBM TDB, vol. 19, No. 6, *Self-Calibrating Disk Storage Apparatus* by Griffths et al.
IBM TDB, vol. 23, No. 2, Track Locating and Following Apparatus for a Flexible Disk File by Jahnke.
Electronics, vol. 55, No. 8, Apr. 21, 1982, D. Sutton, "Winchester Cartridge Challenges Other Backup Systems", pp. 112-116.

Primary Examiner—Raymond F. Cardillo, Jr.
Assistant Examiner—Steven R. Garland
Attorney, Agent, or Firm—Cesari and McKenna

[57] ABSTRACT

A misposition correction system for correcting misposition errors due to spindle runout and other slowly varying errors in a servo positioning system of a magnetic disk storage device. The system includes means for dynamically measuring misposition error with respect to a data track centerline using an anti-aliasing analog filter, means for digitizing the measured analog signal and for removing selected harmonics of the fundamental-frequency of the resulting cyclic error signal, means for transforming the digitized error signal by a matched digital filter whose transfer function contains independently adjustable DC gain, fundamental-frequency gain, and phase lead components thereby to generate a misposition error correction signal that matches the electrical and mechanical response characteristics of the servo system. Further, the system includes means to iteratively refine the correction signal by re-applying it to the servo controller when measuring misposition errors with respect to the data track centerline. The system stores separate misposition correction signals for each transducer on the disk so that one of several correction signals can be selected depending on which transducer in the device is selected. The system further includes means for generating a bias force correction signal to correct for non-linear position errors resulting from variations in bias forces acting on the transducer carriage over its range of radial displacement.

19 Claims, 10 Drawing Figures

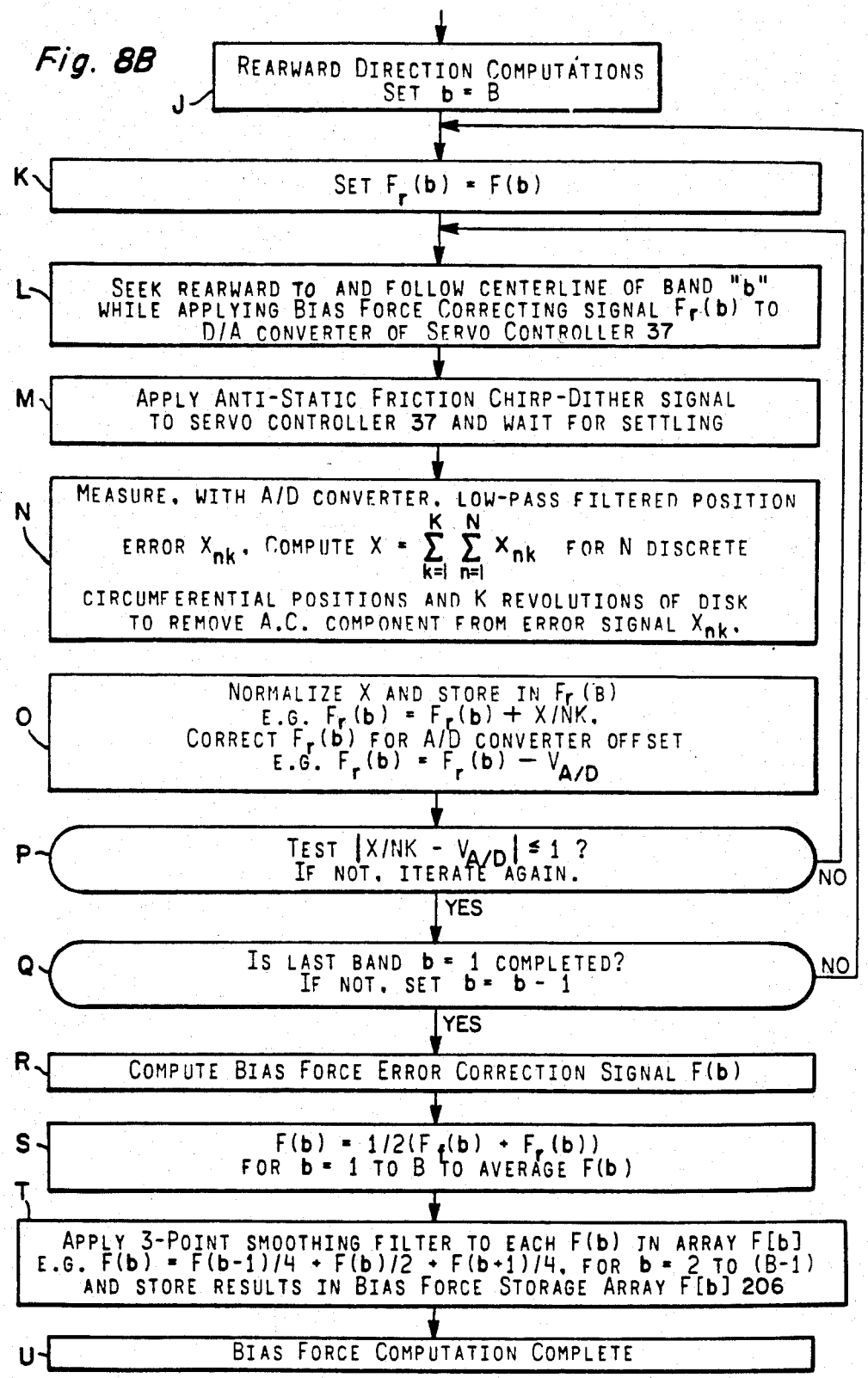

ADAPTIVE MISPOSITION CORRECTING METHOD AND APPARATUS FOR MAGNETIC DISK SERVO SYSTEM

CROSS REFERENCE TO RELATED PATENT APPLICATIONS

This invention is related to commonly assigned U.S. patent application Ser. No. 06/376,971 entitled CONTINUOUS-PLUS-EMBEDDED SERVO DATA POSITION CONTROL SYSTEM FOR MAGNETIC DISK DEVICE, filed on May 10, 1982, by the same inventor hereof, the application being incorporated herein by reference.

BACKGROUND OF THE INVENTION

This invention pertains to a servo control system for use in a magnetic disk storage device. More specifically, the invention concerns a servo control system that adaptively corrects dynamic and static alignment errors between a data head and a data track centerline on a data disk in the storage device.

Disk storage devices are used in data processing system for storing relatively large amounts of information which can generally be accessed within milliseconds. Structurally, a typical storage device comprises a rotating magnetizable disk medium having several surfaces, in the form of an asssembly of one or more stacked platters, on which data is magnetically sensed and/or recorded in addressable sectors located on circular data track centerlines. The disk assembly is mounted upon a drive spindle in the storage device that rotates it at a constant speed, about 3600 revolutions per minute. The storage device also includes one or more transducers, or read/write heads, associated with each surface of the disk. The transducers are mounted in spaced relation on an arm of a movable transducer carriage. A servo controller actuates the carriage in a controlled fashion to move all the data heads in unison radially over the disk surfaces thereby to position any one of the data heads over a selected track centerline. Since all of the data heads on the carriage move together, the device also includes control circuitry that selects one of the read/write heads to perform a data transfer operation.

The servo controller responds to commands from the data processing system. The controller does this by transforming these commands into an analog servo signal which ultimately drives, usually through a power amplifier, an electro-mechanical actuator that connects to the transducer carriage.

Typically, the disk device operates in one of two different modes. The first is a "seeking" mode in which the magnitude of the servo signal is used in a controlled fashion to drive the carriage, and thus the selected data head, to travel to the vicinity of a desired circular track centerline; once the data head reaches that vicinity, the system is then switched to a second or "track-following" mode. In the track-following mode, the position of the actuator is controlled to cause the center of the selected data head to align itself with the centerline of the data track. However, even in this mode there exists a finite alignment error between the center of the data head and the selected track centerline. The magnitude of this alignment error places an upper limit on the data track density and thus, on the data storage capacity of the storage device.

To minimize alignment error, servo systems typically employ formatting information prerecorded on the data disk to allow the controller to detect the displacement between the data head and the track centerline. A preferred format might include servo data that is continuously prerecorded along servo tracks on a dedicated surface of the disk assembly ("dedicated" servo data), together with servo data that is prerecorded in circumferentially spaced servo sectors interspersed, or embedded, between adjacent pairs of storage data sectors on a data surface of the disk assembly ("embedded" servo data). Dedicated servo data is read by a read-only servo head, while embedded servo is read along with the data by a read/write head and thereafter separated from the data by servo data processing circuitry.

The servo data from both the dedicated and data surfaces is decoded by the disk controller, thereby enabling it to modify a servo control signal, if necessary, and thus continuously maintain the position of the data head in alignment with a selected data track centerline. Several factors, however, limit the alignment accuracy, and thus the maximum attainable data track density, of a disk storage device. The most common of these factors stem from electrical and mechanical disturbances or noise. D.C. Bias forces and electrical offsets are examples of some disturbances. A most notable mechanical disturbance is spindle "runout", or "wobble", which is the difference between the actual centerline of a track and the effective centerline presented to a head positioned a fixed distance from the mounting center of the disk. It is typically caused by slight eccentricity in the mounting of the disk on its drive spindle. Runout is more prevalent in disk systems using exchangable disk cartridges and results from even the slightest off-center mounting (e.g., a fraction of a thousandth of an inch), as well as from slippage or tilt in seating of the disk cartridge after mounting. Carriage play between the transducer carriage and its guide rods, as well as misalignment due to uneven thermal expansion of the carriage, arms, disk, or transducers, further contribute to the mechanical disturbances. Generally, positioning tolerances should be within $\pm 10\%$ maximum of track pitch (e.g., spacing between adjacent track centerlines). Thus, for example, a 1000 track-per-inch servo system should maintain a data head within $\pm 100$ micro-inches of a data track centerline. With typical currently available exchangeable disk systems, such alignment accuracy is not readily attainable.

Control system lag is another factor that affects positioning accuracy. Lag is the time delay between the time that the controller detects an off-track condition and the time that the actuator begins to move the transducer into alignment with the data track centerline. Some of this delay is attributable to the electrical response characteristics of the servo control system, such as, for example, that resulting from a low sampling rate; the remaining delay is attributable to the mechanical response characteristics of the electromechanical actuator. These delays characterize the "bandwidth" of the servo control system. The greater the bandwidth, the faster the positioning system can respond to an off-track condition thereby providing tightly controlled positioning of the data head. A positioning system having high bandwidth provides increased data track density because centerlines can be followed within a smaller tolerance. There are other factors, as well, that contribute to misalignment during track following operations.

Conventional methods of increasing servo bandwidth include increasing the frequency of structural mechanical resonances, providing continuous position feedback from a dedicated servo surface, and providing a higher sample-rate position feedback emanating from the data surfaces, among others.

DESCRIPTION OF PRIOR ART

One approach for overcoming some of the effects of the electrical and mechanical disturbances has been to improve the tolerances of the mechanical and electrical circuit components of the servo system, but this is an expensive proposition and is only marginal at best in solving the problem. Thermal compensation networks have also been used to reduce head misalignment resulting from uneven thermally induced dimension or position changes of the mechanical components. This approach only partially corrects misalignment errors of the transducer because it is based on a model that attempts to correct only some of the average offset errors, but not the runout errors.

Another approach for improving head alignment has been to provide sectorized, i.e. embedded, servo positioning data directly in the storage data track. This approach has been used as an alternative to, as well as a supplement to, providing servo positioning information on a dedicated surface of a disk. The controller uses the sectorized servo data to update its servo signal between the passage of successive data sectors. U.S. Pat. No. 4,208,679 assigned to the assignee hereof, describes such a system. This approach, however, does not overcome bandwidth limitations of the servo system and thus cannot compensate for control system lag. In fact, a system employing solely embedded sectorized servo data has a slightly reduced bandwidth due to a time-lag between sampling of the servo data in the servo sectors.

A more recent approach to improving track following operations has been to dynamically modify the servo control signal with a supplementary correction signal during a read/write operation. A "misposition" error correction servo signal counters a previously measured, cyclic off-center transducer alignment error. This signal can be derived with the aid of one or more prerecorded position-reference tracks on the disk. It operates by measuring off-center track misalignment when a transducer is positioned at a radially fixed, stationary reference point over the position-reference track on the rotating disk. Misposition errors associated with various circumferential positions are sampled and stored, and later recalled and applied to the servo controller during a subsequent read/write operation. U.S. Pat. No. 4,136,365 issued to Chick et al. describes such a system. This system, however, lacks the use of phase compensation and noise reduction techniques. It also does not employ an iterative procedure to refine the misposition error measurements. Without noise reduction, successive iteration of measured runout, if performed, cannot be employed to attain an optimal runout rejection correcting signal.

U.S. Pat. No. 4,135,217 issued to Jacques et al. describes another system that modifies a servo position signal with a misposition error correction signal. Jacques, et al. derive their misposition error signal from a coarse positioner on the transducer carriage, rather than from the disk medium itself. It does not allow measurement and correction of the alignment errors experienced at the data head, and could give false correction information as static and dynamic errors can be quite different for each data head in the system. Again, noise reduction and iteration are not used in the Jacque system.

Moreover, none of the aforementoned schemes attempt to correct for d.c. bias-force positioning offsets that may even be a non-linear function of the radial position of the carriage.

SUMMARY

In view of the foregoing, an objective of this invention is to improve track following accuracy and thereby increase the maximum attainable data track density in a magnetic disk storage device by dynamically correcting transducer alignment errors resulting from cyclic misposition errors and electrical and mechanical disturbances in the servo system.

Another objective of this invention is to provide a misposition error correcting system that is less susceptible to noise when iterating the misposition error signal.

Another objective of this invention is to provide a misposition correcting system that iteratively and rapidly converges to an optimum misposition error correction signal.

In furtherance of these objectives, one aspect of this invention comprises a servo control system that periodically and iteratively accesses embedded servo information prerecorded on circular data track centerlines on a data surface of the magnetic disk for measuring a misposition error thereby to generate a set of misposition correcting signals that are subsequently applied to the servo actuator to dynamically correct transducer misalignment during a subsequent read/write operation.

In the preferred structure, the data disk contains first and second sets of high-frequency bursts of servo signals in servo sectors on each data surface thereof, the bursts in each set being recorded in alternate track locations at centerlines shifted radially by the width of one-half track with respect to the centerlines of the storage data tracks in the data sectors. A demodulator detects the bursts, and compares their magnitudes to generate a position-error signal. The sum of the magnitudes of the bursts is normalized to insure an accurate reflection of the positioning error. The misposition error signal is measured through an optional low-pass anti-aliasing filter during at least one complete rotation of the disk and then converted to a digital signal. Measurements are made at a plurality of discrete equally-spaced circumferential positions about the disk.

A matched digital filter adjusts the phase of the digitized misposition error signal to compensate for known servo control system lag and known low-pass filter lag; and also adjusts phase lead and gain terms of the fundamental-frequency and selected harmonics thereof, thus allowing for the rejection of high-frequency harmonics. Thereafter, the digital filter generates a correction signal from the phase-corrected misposition error signal. The system iterates the aforementioned process on one or more subsequent disk rotations by re-applying the correction signal to the servo system while again measuring misposition errors to generate a subsequent optimum correction signal. It then stores these optimum correction signals for later use during subsequent read/write operations.

Misposition error information can be stored for each data head in a multi-transducer, multi-platter, disk system. Thus, when subsequently accessing a storage data track, the system selects an associated set of correcting signals. Moreover, any number of iterations can be performed to enable the system to converge to an optimum misposition error correction signal and allow more rapid optimization of a misposition correcting signal. This gives the system the ability to rapidly adapt to slow-time-varying changes in runout.

In accordance with yet another aspect of this invention, the positioning system additionally includes circuitry for correcting d.c. offset errors resulting from electronic offsets and bias forces (or torques in a rotary actuator) which act to radially offset the movable transducer carriage from the desired track location. In this regard, the system measures misposition, as stated previously, and then calculates offset corrections for bias force and d.c. errors at various, preferably at equally-spaced, radial positions of the carriage. The system then stores them in a memory. Whenn a storage data track centerline is subsequently accessed during a read/write operation, the stored bias force or d.c. offset correction information is recalled and applied to the actuator, just as the other misposition error correction information, so that both the misposition and the offset correction signals contribute to the correction of alignment errors.

To generate the bias force error correction signal, again in the preferred embodiment, offset errors are iteratively measured in the forward and reverse direction for each data track centerline by positioning a transducer thereover, average offset error over several revolutions of the disk to reject A.C. disturbances, reapplying the offset error to the transducer positioner and again measuring offset error until a predetermined minimum offset is measured, and then storing the accumulated offset error for each small group of adjacent track centerlines or "bands". The forwardly and rearwardly measured offset error can further be averaged, and the resulting correction table that corrects for even non-linear radial variations of d.c. offset errors for each band can be digitally-filtered and thus smoothed. This procedure permits compensation for striction and friction effects, and also reduces measuring and computing errors. Because offset errors equally affect each data head, the offset error of only one head, preferably a dedicated-servo head, need be measured. The correction data is thus based on radial position and is independent of he selected data head.

Certain other advantages, not possible with the Chick et al. or Jacques et al. systems, can be gained by processing the measured position error signals to produce the dynamic correction signals. Specifically, the phase of the stored misposition information can be shifted to compensate for control system lag and filter lag. Once obtained, the correction signal is re-applied to the servo system to obtain an iterative misposition correcting signal. This and yet further iterations enable the system to converge to a more perfect misposition correction signal.

The fact that position error is cyclic with disk rotation is utilized to advantage by employing a matched filter to better reject noise and undesired harmonics. Digital signal processing enables the fundamental-frequency and selected harmonic frequencies of the cyclic error signal to be independently rejected and/or adjusted in gain and phase. Without employing a matched-filter technique for noise reduction, iteration cannnot be conveniently performed because certain of the high-frequency components of the error signal begin to add without limit with each iteration.

This invention is pointed out with particularlity in the appended claims.

The above and further objectives and advantages of this invention will become apparent by reference to the following detailed description taken in conjunction with the accompanying drawings in which:

BRIEF DESCRIPTION OF THE DRAWINGS

FIGS. 8A and 8B are flow charts of operations performed by the system of FIG. 1 in generating a bias force error correcting signal.

DESCRIPTION OF A PREFERRED EMBODIMENT

Figure 1:
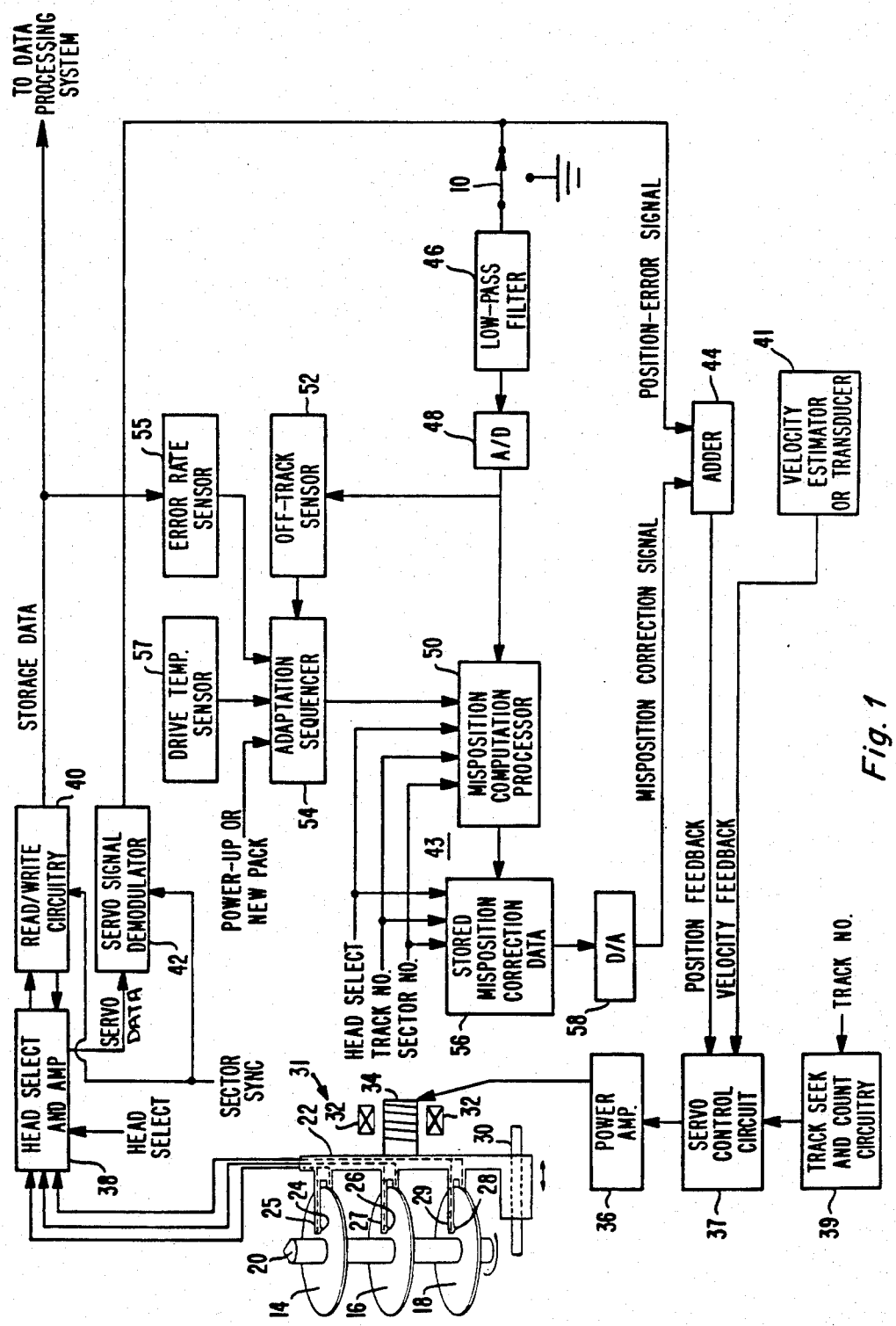
FIG. 1 is a block diagram of an illustrative servo positioning system helpful in explaining the invention.

The servo control circuit diagram of FIG. 1 uses embedded servo data recorded on a data surface of a disk to determine alignment errors. Generally, the system includes a rotating disk assembly in the form of stacked platters 14, 16 and 18 which rotate on a spindle 20. Each platter 14 through 18 may store data on each side thereof in circular data track centerlines. A transducer carriage 22 carries a plurality of read/write heads 24, 26, and 28 for the upper disk surfaces (and corresponding heads, not shown, for the lower disk surfaces) on respective carriage arms, 25, 27 and 29 which radially position these read/write heads over circular track centerlines on upper or lower surfaces of the disk platters 14 through 18. One of the data heads is preferably a read-only servo head positioned over a dedicated servo surface of the disk to supply supplementary high-frequency positioning information to the servo control system.

For purposes of illustration, the transducer carriage 22 is shown as supported by guide rods, one of which is shown as guide rode 30, and is actuated by a linear actuator 31 comprising a fixed stator or "field" coil 32 which drives a lightweight moving coil 34 that is connected to carriage 22. In response to signals applied to coil 34 from a power amplifier 36, carriage 22 moves along guides 30 to position the heads 25-29 over a desired track. In the "seeking" mode of operation, track seeking circuitry 39 counts crossings of data track centerlines in order to advance, slow down, and stop the carriage when it arrives in the vicinity of the selected data track centerline.

A velocity estimator 41 responds to carriage motion by providing to a servo control circuit 37 signals indicative of the rate at which the heads are moving across the disk. Velocity control in the seek mode is used for profiling the speed of the carriage in a conventional manner during a seeking operation so as to decrease the carriage speed as it approaches the desired track, thereby to avoid overshoot and thus to expedite settling of the read/write head over the centerline of the track.

When the selected data head reaches the vicinity of the desired data track (e.g., one or two tracks away), the control system enters a "following" mode and develops a "fine" error signal corresponding to the distance of the data head from the track centerline. It uses the signal in a negative feedback arrangement to minimize the error and thus maintain the data head in alignment with the centerline. It is these aspects of control in the head following mode to which this invention relates.

In order to perform this servo control function, the circuitry of FIG. 1 may use embedded servo data that is interleaved with data sectors and prerecorded in spaced servo sectors in the data tracks. To extract the servo information, a head select and amplifier circuitry 38 responds to a head select signal from a data processing device to select one of the possible data heads that is carried by the transducer carriage 22. The read/write circuitry 40 and servo signal demodulator 42 separate the read/write storage ("user") data and servo data in response to a sector synchronizing signal that is generated, in the preferred embodiment, by servo signals prerecorded on a dedicated surface of the disk assembly. The synchronizing signal may also be extracted from the embedded data-head signal, from an indexed sector wheel attached to the rotating disk assembly, or from other timing and control circuitry that responds to various index locations on the disk assembly.

Once separated, read/write circuitry 40 transfers the storage or user data to the data processing system, while the servo demodulator circuit 42 demodulates the servo signals to produce during the track following mode, a position error signal which indicates the relative position between a data head and a track centerline. The resulting position-error signal is, in the preferred embodiment, a sampled-data signal that is updated periodically many times per disk revolution or once after each sector.

This signal is transmitted to the servo control circuit 37 via an adder circuit 44. The adder circuit 44 combines the position error signal with a previously measured misposition correction signal. The combined signals from adder 44 are used to dynamically compensate for periodic or slowly varying misalignment of the data head.

In order to compute the misposition correction signal, the position error signal from the servo signal demodulator 42 is passed through a switch 10 and a low pass filter 46 to an analog-to-digital converter 48. This filter attenuates high-frequency noise which does not constitute true position error; when embedded servo data is used, it also attenuates high frequency components and minimizes possible aliasing problems in connection with the subsequent analog to digital conversion. After the A/D converter 48 digitizes the analog signal, it transfers the digital signals both to a misposition computation processor 50 and to an off-track sensor circuit 52. Switch 10 allows that misposition computation processor 50 and off-track sensor 52 to compensate for offsets in the filter 46 and converter 48.

An adaptation sequencer 54 initiates the computation processor 50 which computes misalignment and corresponding correction data at various circumferential positions of the data disk. The misalignment correction data is stored in a memory array 56 which comprises a digital memory in which the digitized position-correction signals are stored as discrete words. Memory array 56 itself comprises a storage matrix 200 and a storage array 206 (see FIG. 5). Each entry is tagged with its associated data head, track number and sector number corresponding to the HEAD SELECT, TRACK NO., and SECTOR NO. signals from the data processing system so that when they are recalled during a subsequent read/write operation, the corresponding correction signal is combined with the POSITION-ERROR SIGNAL in the adder 44 prior to being supplied to the control circuit 37. A D/A converter 58 converts to an analog signal the stored digital correction data contained in the array 56.

The adaptation sequencer (which may comprise simply a periodic timer, which periodically emits a pulse to cause recomputations in processor 50) activates the computation processor 50 in response to a variety of conditions to compute desired misposition correction data, e.g., in response to detection of an off-track condition by a sensor 52 in the track following mode during a read/write operation, or in response to detection of errors by a data (e.g., a cyclic redundancy check error detection circuit) or in response to a temperature change in the disk unit by greater than a predetermined amount. Such a change might be detected by a drive temperature sensor 57.

Other conditions, as well, would effect a recomputation of correction data, such as, for example, a POWER-UP signal or a NEW PACK signal supplied to the adaptation sequencer 54. The POWER-UP signal is generated when the system is first powered up or turned on, and the NEW PACK signal is produced when a new disk cartridge is introduced into the drive unit. In the former case, the disk drive would normally be at a temperature cooler than the condition existing at the time when the last misposition correction data was calculated and, in the latter case, a difference in eccentricity between the previous and the new disk cartridge would most likely exist and would thereby necessitate recomputation of correction data in the array 56. In the preferred embodiment, a time scheduler in sequencer 54 periodically triggers processor 50 to measure position-error and recompute misposition correction data in array 56.

Figure 2:
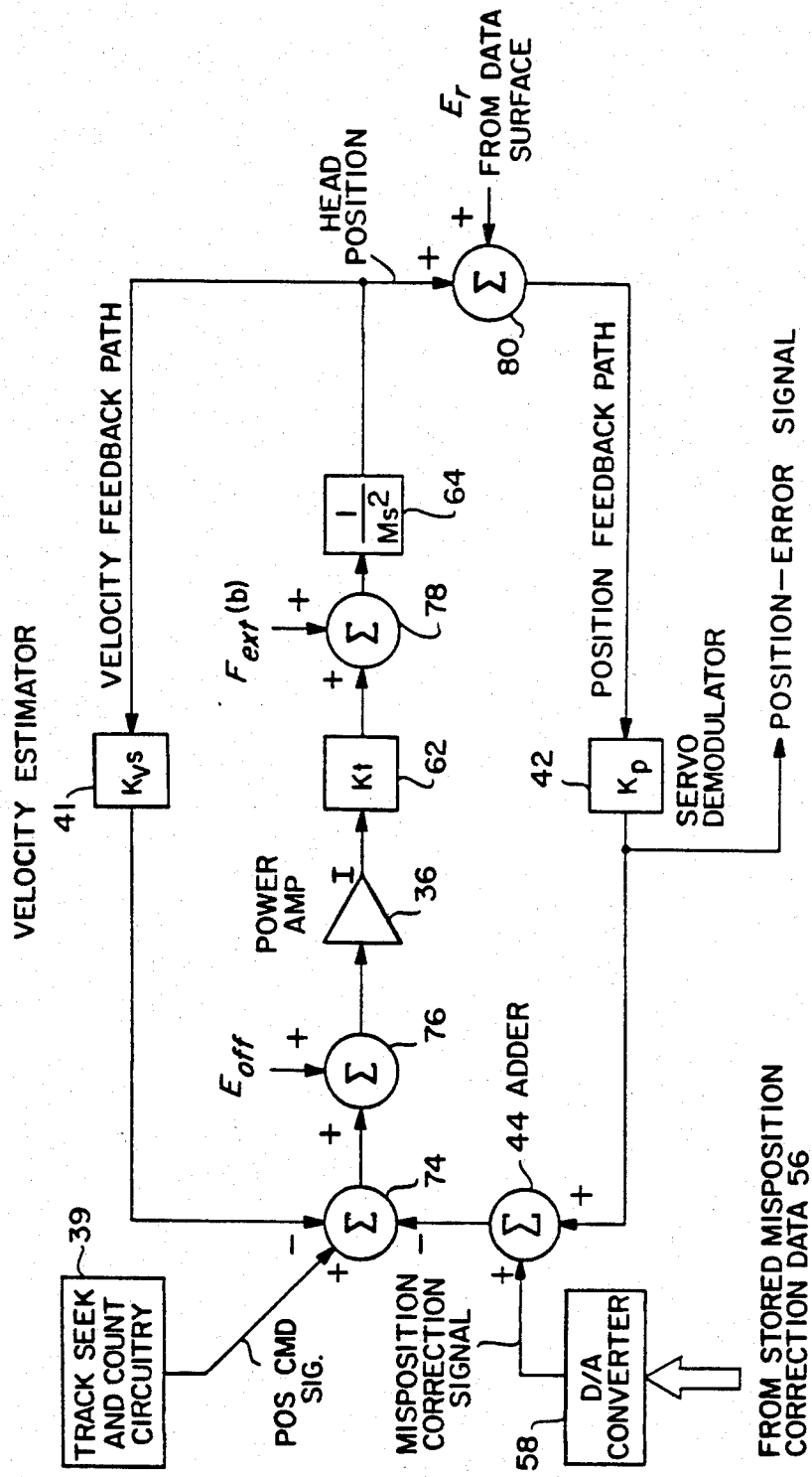
FIG. 2 is a block diagram depicting a closed-loop position control system which characterizes the invention.

The correction signal produced by the processor 50 is derived by measuring the cumulative effect of offsets and disturbances in the servo system. These disturbances and offsets are best illustrated in the generalized closed-loop position control system diagram shown in FIG. 2. In operation, a position command signal emanates from the track seek and count circuitry 39. In the track following mode, the position command signal is near zero. A control current I produced by a power amplifier 36 drives the servo actuator assembly. As shown, the effects of current "I" on the servo actuator is characterized by a motor constant Kt and a Laplace transfer function $1/Ms^2$, where M is the total carriage assembly inertia. They are represented by a force constant 62 and an inertial load 64.

A position-error signal detected by the selected data head and processed by servo demodulator 42 is transferred along the position feedback path to adder 44 where it is combined with a misposition correction signal from D/A converter 58. The position information of the inertial load 64 also is supplied to velocity estimator 41 comprising a differentiation and gain term $K_\nu s$ in the velocity feedback path. The feedback signals from estimator 41 and adder 44 are both fed back to a summing junction 74 which alters the control current "I" produced by the amplifier 36 in a manner to maintain the data head over the desired data track centerline.

An inherent electronic system offset $E_{off}$ is represented at summing junction 76 and external bias-force signal $F_{ext}(b)$ is represented in the feedback control system at a summing junction 78, where "b" designates the band of tracks over which the carriage is positioned. The bias-force may be a non-linear function of the radial position of the carriage and results from "windage" (air pressure), head-cable forces and magnetic bias forces in the magnetic actuator itself. Other disturbances $E_r$ in the nature of spindle runout resulting from eccentricity of the rotating magnetic disk medium is introduced in the position feedback path at a summing junction 80. This is an a.c. term and is typically cyclic with disk rotation. It is likely to be different for each selected data head. The combination of these disturbances $E_{off}$, $F_{ext}$, and $E_r$ combine to produce a misposition of the selected data head relative to its data track and thus force the position-error signal to be nonzero.

Figure 3:
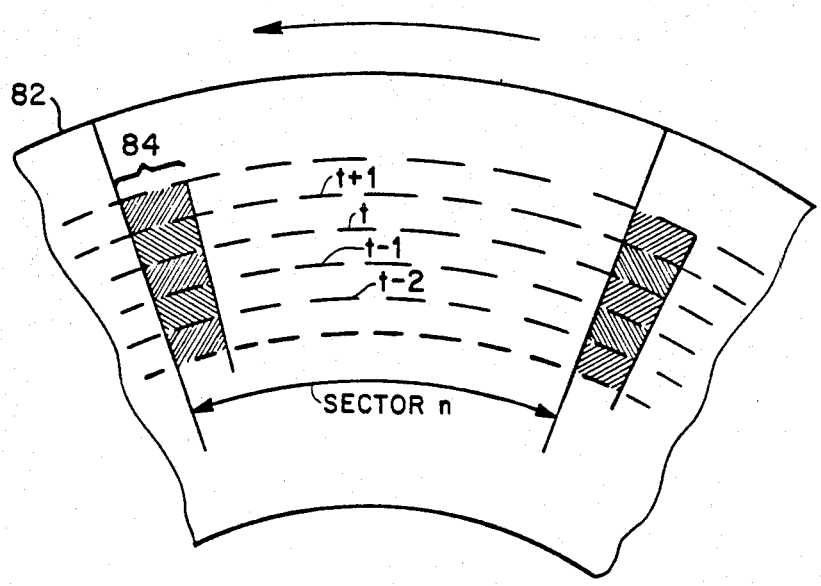
FIG. 3 depicts a portion of a data disk from which servo positioning information is derived.
Figure 4:
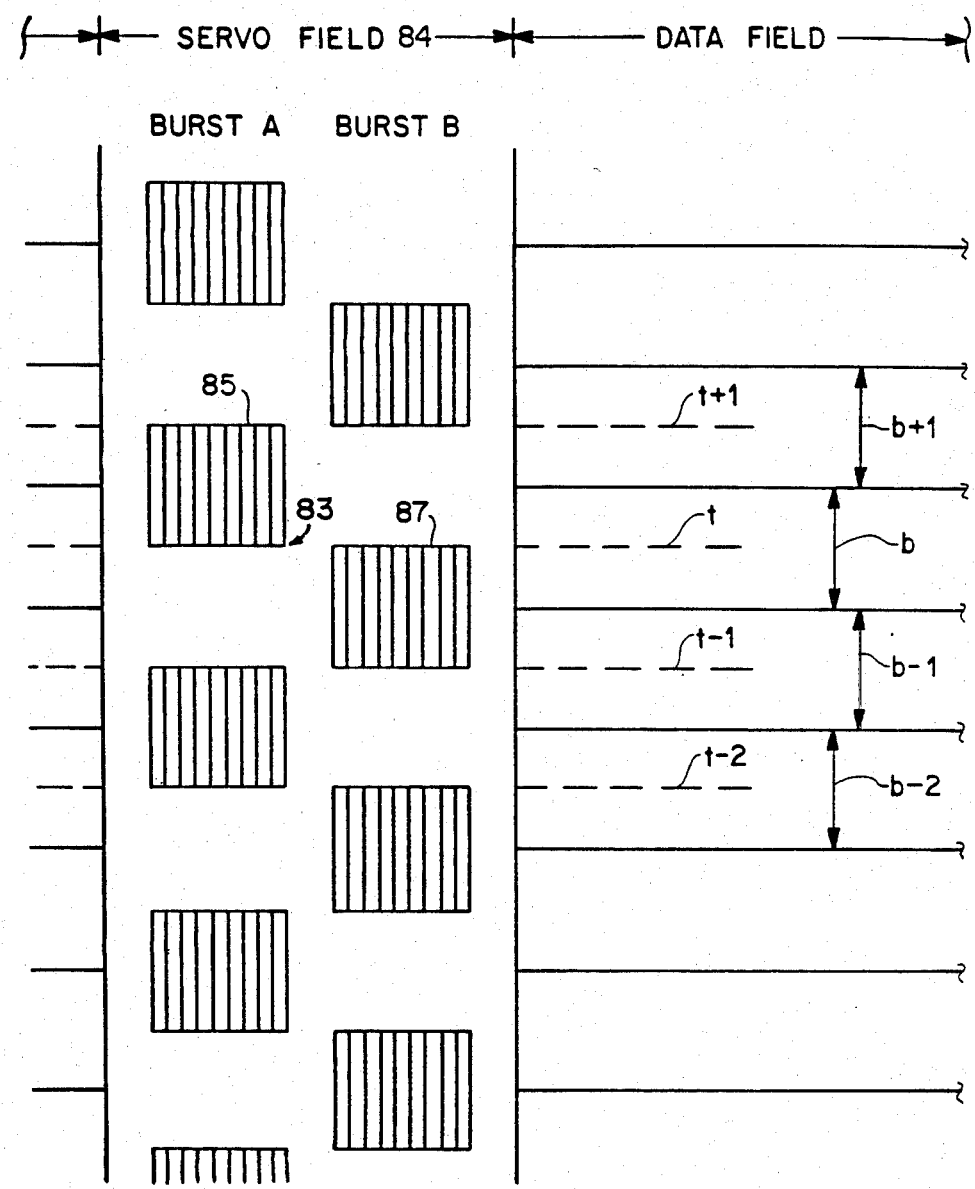
FIG. 4 is an enlarged illustration of a portion of the disk of FIG. 3.

The preceeding description forms the general background for understanding the nature and operation of the present invention which will now be described in detail. Referring now to FIG. 3, there is shown one sector located on a segment of a data surface of the disk platter assembly, while a portion of the tracks of FIG. 3 is shown in more detail in FIG. 4. My preferred disk has fifty-seven sectors. As seen, the data surface 82 comprises a number of data track centerlines t, t+1, t-1, etc. which are aligned with boundaries 83 of servo bursts 85 in a servo field 84.

The data surface includes in the servo field 84, a series of radially aligned servo bursts (FIG. 4) which are written alternately at half-track radial offsets to the storage data which follows each servo burst field 84. Since there are two types of bursts, an A-type and a B-type, located at different circumferential locations, the servo demodulator can differentiate between them and determine their relative amplitudes. The data head is aligned over a boundary when the detected signal amplitudes are equal. The difference between the amplitudes consititutes the position-error signal and the polarity of the difference signal indicates the direction of misalignment. This position-error signal is updated after the passage of each servo sector field 84.

From this position-error signal, misposition is computed. To help reduce noise in this signal, I use an anti-aliasing analog filter to filter the servo data from the dedicated surface. This feature permits a lower sampling of servo data on the sectorized data surfaces. Since the rate at which data is fed out through the D/A converter for runout correction must at least exceed the servo bandwidth in order to assure a smooth correction, the minimum number of samples measured per revolution is determined by the servo bandwidth. In the illustrative embodiment, with a servo bandwidth of about 500 Hz, and a disk spindle spinning at 60 revolutions per second with 57 sectors per revolution, only 32 versus 57 sample measurements per revolution were utilized. This significantly reduces the computation time of the digital filter processor 212. This rate could be almost half as much again with no deleterious consequences in rejecting fundamental-frequency runout.

The D.C. and fundamental-frequency components of the cyclic misposition information are extracted, and the remaining components rejected, by digitizing them at "N" discrete circumferential locations about the disk to establish an array x[n] of repeatable position error samples, and then processing them by a digital filter whose impulse response matches the characteristic waveform of the cyclic misposition signal, i.e., a "matched filter." As the characteristic waveform of the fundamental-frequency component of the position error signal is sinusoidal and has a periodicity corresponding exactly to the speed of rotation of the disk assembly, the processed waveform can be represented by:

$$x(n) = DC + A_1 \sin\left[\frac{2\pi(n-1)}{N} + \phi_1\right] + \sum_{i=2}^{N} A_i \cdot \sin\left[\frac{2\pi(n-1)i}{N} + \Phi_i\right] \quad (1)$$

for $1 \leq n = N$.

The impulse response h(n) of the desired matched digital filter is:

$$h(n) = \frac{A_{FF} \cdot 2 \cdot \cos}{N}\left[\frac{2\pi(n-1)}{N} - \phi_h\right] + \frac{A_{DC}}{N} \quad (2)$$

for n=1 to N, where $A_{ff}$ is the desired fundamental-frequency gain of the filter, $\phi_h$ is the desired phase-lead to correct control system lag and the lag of the anti-aliasing filter at the fundamental frequency, and $A_{DC}$ is the desired D.C. gain.

The transformation of the misposition error data is performed with an 8-bit microprocessor as the misposition measurement and computation processor 50. The error samples are digitally convolved with h(n) to produce a misposition correction signal y(n)=E which is applied to the servo control circuit 46. By convolving h(n) with the cyclic error samples:

$$y(n) = \sum_{i=1}^{N} h(i) \cdot x\left[(i + n - 2)MOD\ N + 1\right] \quad (3)$$

$$y(n) \approx A_{DC} \cdot DC + A_{FF} \cdot A_1 \sin\left[\frac{2\pi(n-1)}{N} + (\phi_1 - \phi_h)\right] \quad (4)$$

It is seen that y(n) lacks harmonics which are specific to the measurement tracks and are not suitable for use in correction. It also lacks high-frequency terms that result from roundoff errors in the addition of previous iterated correction signals. In essence, y(n) is the best approximated sinusoidal signal of the error signal x(n) with modified DC gain, AC gain and AC phase.

Advantageously, the correction signal y(n) has a phase-lead term $\phi_h$, a fundamental-frequency gain term $A_{FF}$, and D.C. offset term $A_{DC}$ which can be adjusted to match the electrical and mechanical response of the servo system. Adjustment of the phase lead term $\phi_h$ permits the digital filter to compensate for, inter alia, control system lag, anti-aliasing filter lag, and delay induced in the measurement and application of the position error and misposition-correction respectively.

To further refine the correction signal y(n), this process is iterated by re-applying a previously stored correction signal to the servo control circuit 37 when measuring off-center displacement. The measured signal can also be averaged over several revolutions of the disk platter assembly. In some cases, it might be desirable to convolve certain other harmonic components of the misposition errors samples to derive a better error correction signal. In that case, separate gain terms and phase lead terms are preferably used for these other harmonic components. This simply modifies the values of the array h(n) by adding sinuosoidal terms of the appropriate gain and phase. Using this technique, it is possible to dynamically maintain the position of a data head in a conventional electro-mechanical positioning system within approximately fifty micro-inches of a track centerline.

Generating Misposition Error Correction Data

Figure 5:
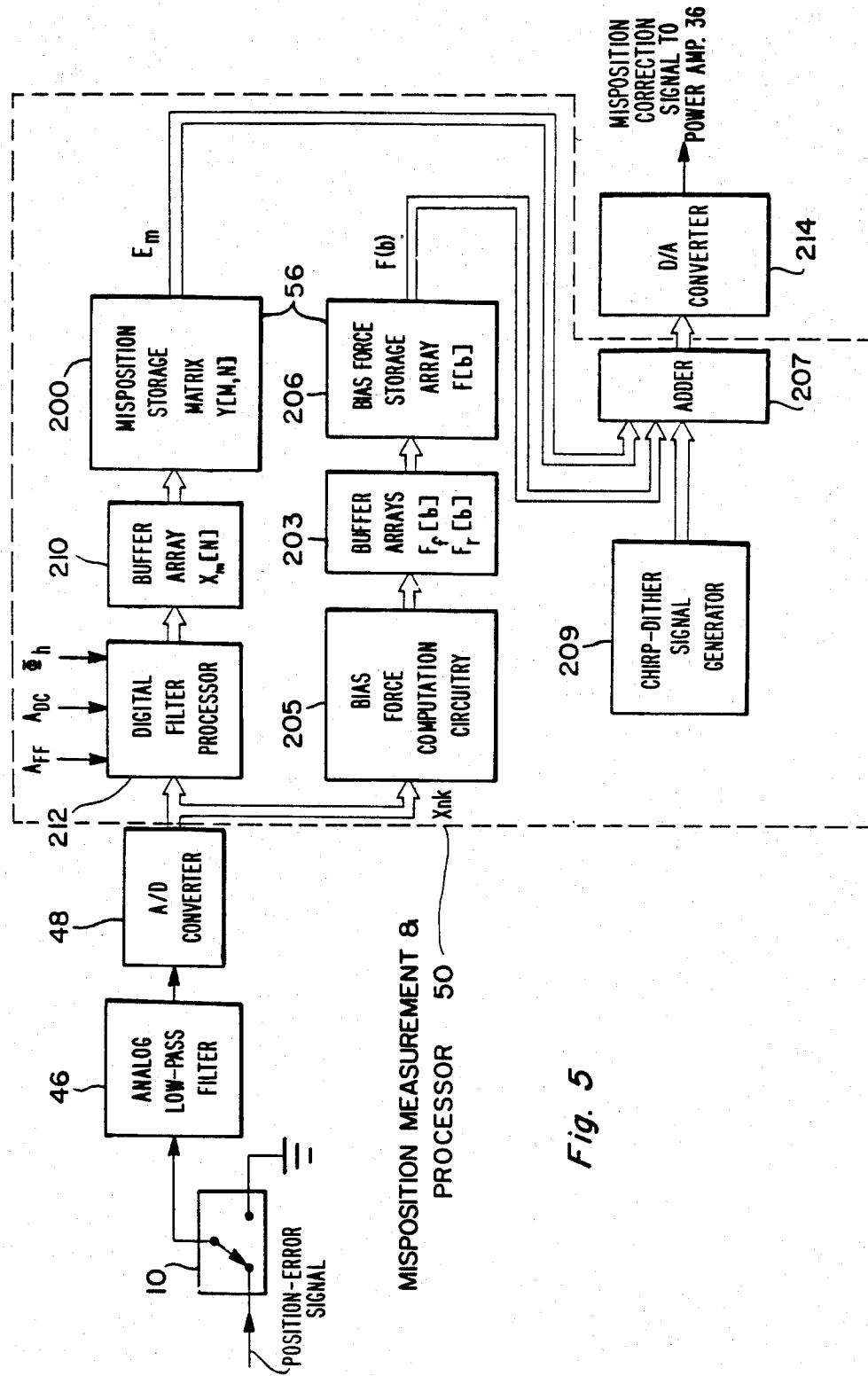
FIG. 5 is a block diagram showing the misposition measurement and computation circuitry of the invention in detail.
Figure 6:
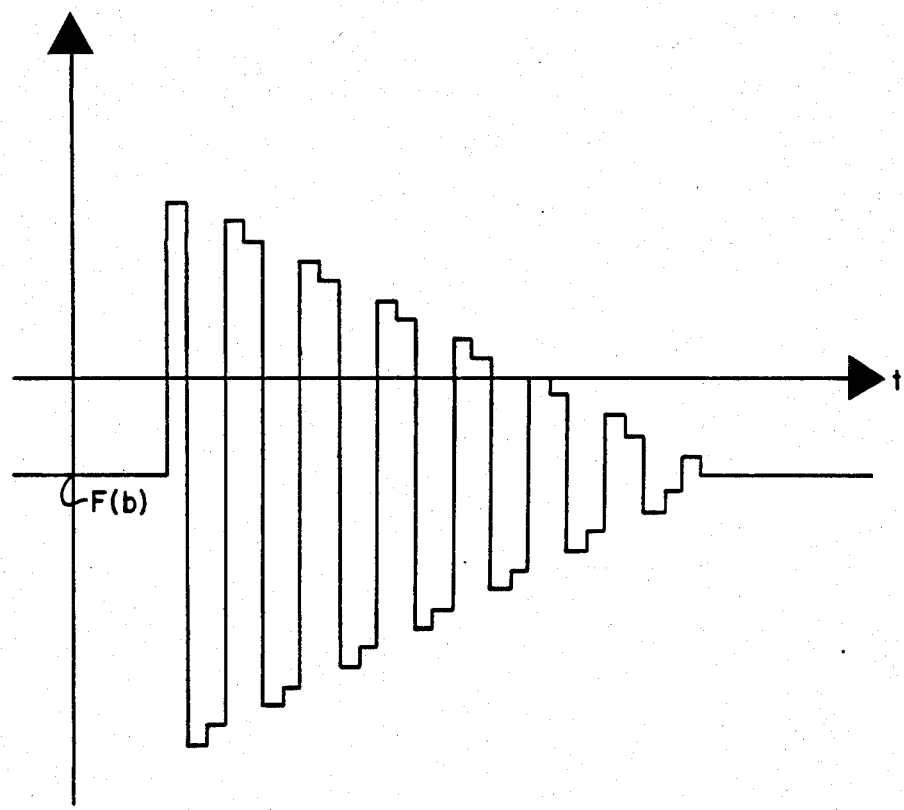
FIG. 6 shows a control signal wave form generated by the chirp-dither signal generator of FIG. 7.
Figure 7A:
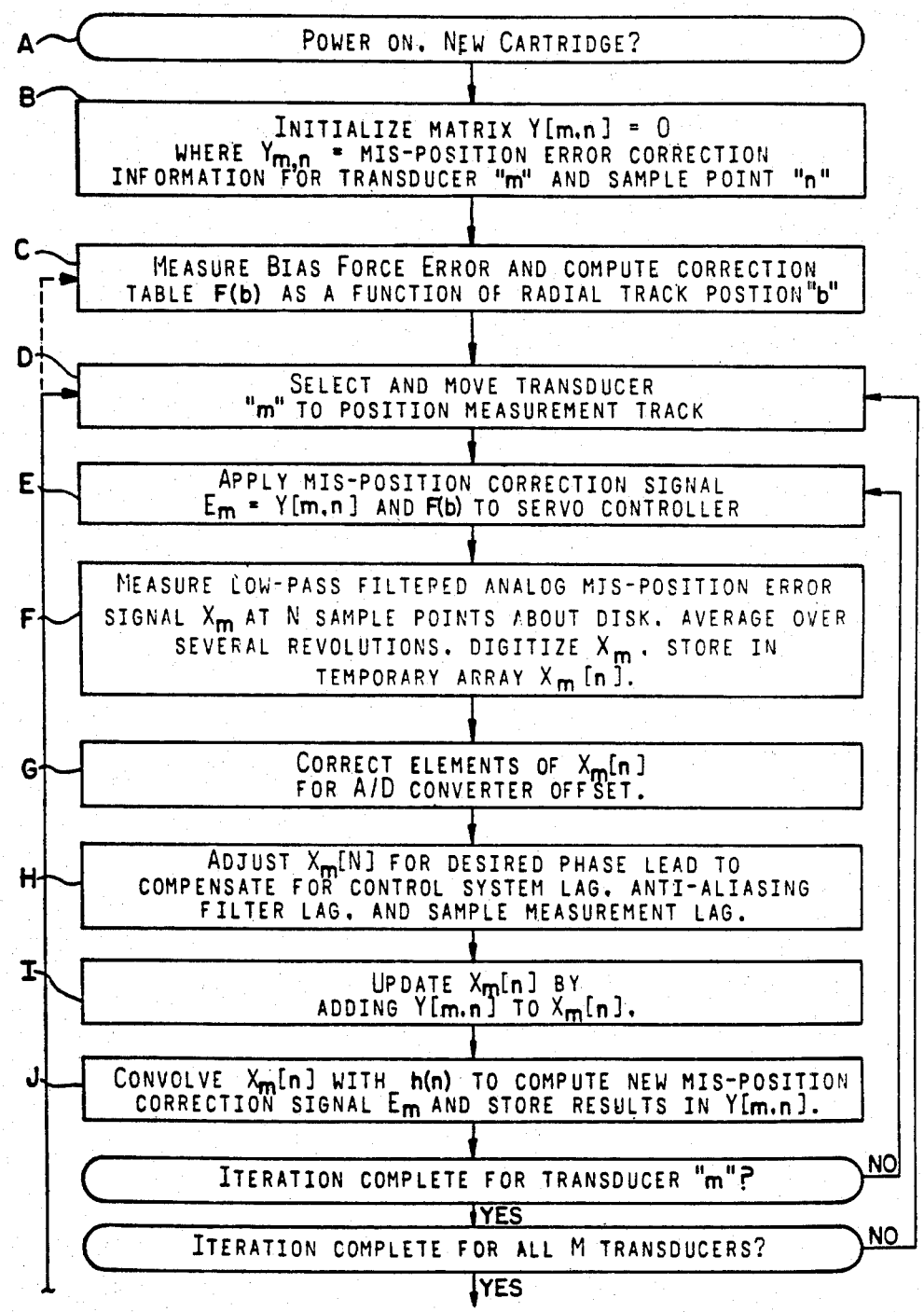
FIGS. 7A and 7B are flow charts of operations performed by the servo control system of FIG. 1 in generating a misposition correction signal.
Figure 7B:
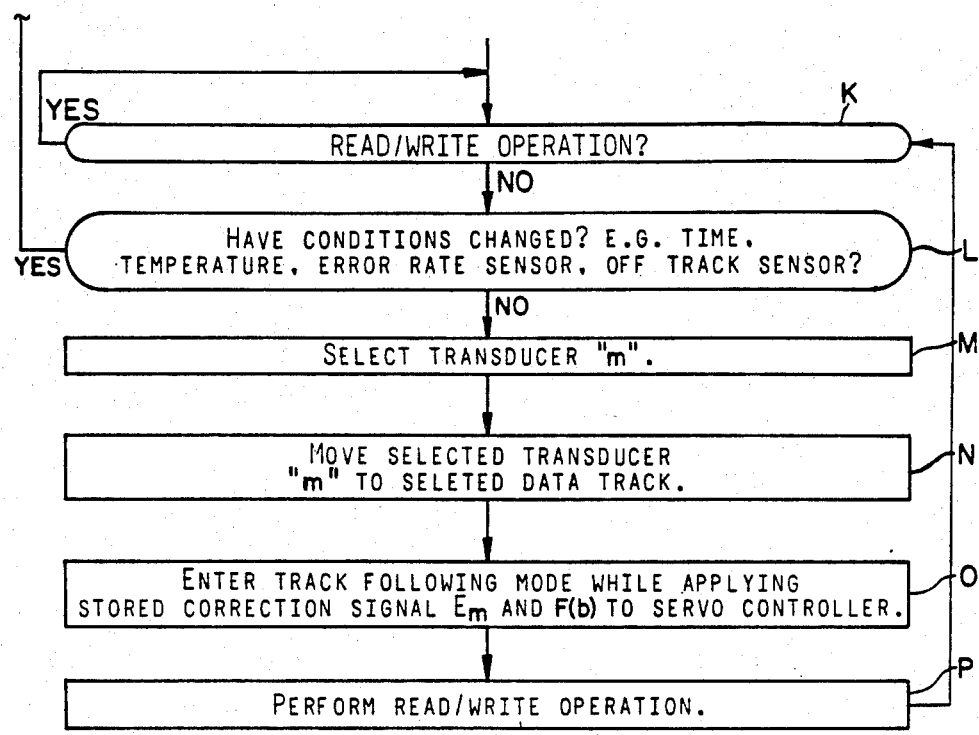

Refer now to FIGS. 1 and 5 together with the flow chart depicted in FIGS. 7A and 7B. When the disk drive is started, the processor 50 sets to zero the elements of the dynamic correction array Y[m,n] stored in the storage array 56. The processor 50, in preparation for measuring the position-error and converting it to digital signals, calibrates the analog-to-digital converter 48 and low-pass filter 46 by referencing a zero-voltage ground reference through switch 10 thereby to correct A/D converter and low-pass filter offset errors. In the next step C, the processor 50 enables the control system to measure bias forces F(b) acting on the carriage 22 as a function of radial position of the carriage. This procedure is subsequently explained in greater detail. In step E, the previously stored correction signal, $E_m$, and a bias force correction signal, F(b), associated with the radial position of a designated position-measurement track are applied to the servo control circuit 37 via the adder 44. In the first instance, the dynamic correction signal $E_m$ is zero.

While the selected transducer is positioned over a track centerline, in step F, the position-error is measured by the A/D sampler 48 through an optional anti-aliasing analog low-pass filter 46. The filter 46 receives the position-error signal from the servo signal demodulator 42 updated at discrete time intervals. The sampler 48 produces "N" discrete digital error samples $X_n$ that constitute an array X[n]. An 8-bit representation of the error samples provides sufficient resolution of position-error levels. Measuring of position-error can be averaged over several revolutions of the disk.

In step H, the array X[n] is phase-shifted by an amount equal to the known closed-loop control system lag, anti-aliasing filter lag, and other known lags existing in the servo positioning system. This can be accomplished by shifting the position of elements in the array.

In step I, the array X[n] is next updated by adding to it the previously stored correction information Y[m,n] in the correction signal storage matrix 200 associated with the transducer "m". As previously stated, on the first iteration, Y[m,n]="zero". This operation is allowable since $A_{DC}$ and $A_{FF}$ are essentially unity for most applications.

In step J, the updated array X[n] is convolved with h(n) by a digital signal processor 212 to produce a new misposition error correction array $E_m$[n]. Performing the digital filter operation on the sum of the previous correction data and the new error data means that computational roundoff and truncation errors will not build up over many iterations and that the best fundamental-frequency sinuosoidal correction signal will always be available. The fundamental-frequency gain term $A_{FF}$ and the D.C. offset gain term $A_{DC}$ of the digital signal processor 212 are adjusted to compensate for known gain characteristics of the closed-loop servo system and the error measurment apparatus. Of course, if step H is omitted, the phase lead term $\phi_h$ of the signal processor would also be adjusted to compensate for control system and other leg. The results of the convolution are stored in the appropriate row Y[m,n] in the storage array 200.

Steps E through J are repeated, or iterated, for any number of times. I have found that two iterations produce a position correction signal that rejects 90% to 95% of the position error.

Steps E through J are repeated for each transducer "m" in the system for producing a misposition correction signal $E_m$ associated with the respective transducers, or surfaces of the disk assembly. This provides even greater positioning accuracy, especially for mispositioning errors resulting from runout that is different for each data transducer or disk surface.

Generating Bias Force Correction Signal

Another aspect of my invention includes a method and apparatus for correcting bias force or torque errors, as the case may be (force is associated with linear type carriage actuators and torque is associated with rotary-type carriage actuators). It is performed in step C of FIG. 9A, and is further particularized in FIGS. 10A and 10B.

To correct these bias force errors, the adaptation sequencer 54 (FIG. 1) undergoes an iterative process to measure the bias force errors as a function of radial position of the transducers over the disk surfaces. The errors are stored in a storage array 206 of FIG. 7, and when the system performs a read/write operation, an error correction signal attributable to the previously measured and computed stored bias force error correction associated with the selected radial track position is first combined with correction data in array 200 by an adder 207, and then applied to the servo control circuitry 37 thereby to correct both for dynamic misposition errors and for bias force errors.

Figure 8A:
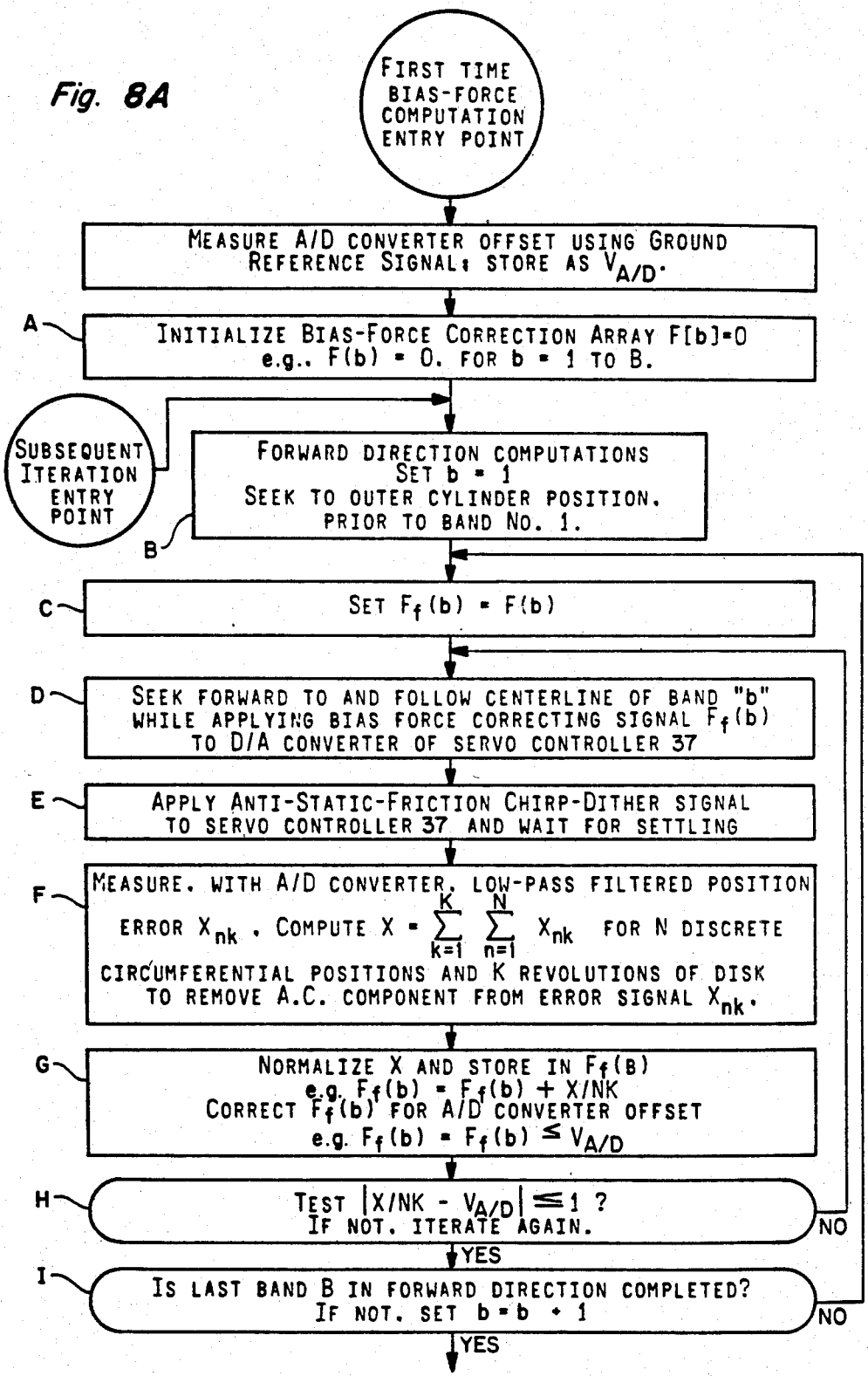

Considering now in detail the manner in which the adaption sequencer 54 and the computation circuit 50 measures the bias force errors, particular reference should be made to FIGS. 8A and 8B. The bias force storage array 206 is first initialized by setting all values therein to zero. In steps B through I of FIG. 8A, the computation circuit 205 first determines bias force errors that result when the carriage 22 is moved in a forward direction. A variable "b", representing a group of track centerlines, is set equal to one in step B. In a particular band "b", the bias-force error is essentially constant. In step C, the circuit 205 initializes a forward direction bias force array $F_f(b)$. In step D, the track seeking and following circuitry 39 and servo control circuit 37 respectively control a selected data head to seek and follow a track at the center of band b=1 while applying the previously computed forward direction bias force correction signal $F_f(b)$ to the servo-controller 37. In the case of a dedicated servo surface, the dedicated servo transducer is used for mapping the bias force errors.

To reduce static friction in the carriage 22, a generator 209 produces a chirp-dither signal and applies it to the actuator assembly 32-34 through adder 207. The chirp dither signal "jitters" the carriage 22 to bring it to a position of zero energy state. Thereafter, the bias force error $X_{nk}$ is sampled by analog-to-digital converter 48 through low-pass filter 46. These error signals $X_{nk}$ are measured at N discrete circumferential locations about the disk in the same fashion as they were measured for calculating the misposition correction. The bias force error samples $X_{nk}$ are summed over K integral revolutions of the disk thereby to remove the A.C. component from the error signals. The sum of all the measured bias force errors are normalized by dividing the NK sums of $X_{nk}$ by a factor of NK.

Also, the bias force error is corrected for any analog-to-digital converter offset that was previously measured in step B of FIG. 9A. The normalized signal is then stored in position "b" of the storage array 206.

In step H, the absolute value of the normalized measured bias force position error is tested for a predetermined minimum threshold level. In this case, the processor 50 selected one unit of the quantized digital error signal level. If the measured bias force position error is not reduced to the predetermined threshold level, steps D through H are again repeated with the previously measured bias force correction applied to the servo-controller 37. On the next cycle through steps D through H, the measured normalized position error X is less than the previously measured bias force position error X. Ultimately, the measured bias force position error is reduced to or below the predetermined threshold level, whereupon the circuit 50 causes the entry of step I, which performs the same process for the next band "b" in which a data track centerline lies. If the error was at the threshold level of one quantization bit, iteration is complete, but the array element F(b) is still modified by the error. This process is repeated for each band in the forward direction, and when so completed, the system then performs the same computations beginning with the last band b=B while moving rearwardly to the first band b=1. This process is shown in steps J through Q of FIG. 10B.

When both the forward and rearward computations are completed, the computation circuitry 205 computes the error-correcting elements of the bias force correction array 206 by averaging the bias force measured in the forward and rearward direction for each band, as indicated in step S of FIG. 10B. The circuit 205 next applies a three-point digital smoothing filter to the averaged bias force errors by weighting each element in the array F[b]. The weighting is performed by summing one-half of each element with one-fourth of the average measured error in the preceding and succeeding data band. The circuit 205 then stores these weighted errors in the bias force storage array 206. At this point, the bias force computation is complete.

At this juncture, the system proceds with step E of FIG. 7A to compute the dynamic mispositioning correction signal $E_m$. It should be noted that a servo positioning system may incorporate either or both the dynamic mispositioning correction apparatus or the bias force correction apparatus. Further, the smoothing filter applied in step T of FIG. 8B may weight any number of preceding and succeeding averaged error samples; however, a three-point smoothing filter should suffice. Furthermore, bias force positioning errors might not vary differently between the forward direction and the rearward direction, in which case, measurement in one direction would only be required.

Read/Write Operations

FIG. 8B illustrates the procedure for using the misposition correction information stored in the storage matrices 200 and 206 to correct misalignment errors during reading or writing operations. Assuming a valid condition exists when a read or write command is outstanding, transducer "m" is selected and the carriage 22 is moved to the selected data track in reponse to a TRACK SELECT signal supplied to the track seeking and following circuit 39. A HEAD SEL signal also is applied to the stored correction data 56. This signal causes dynamic misposition error correction signal $E_m[n]$ associated with transducer "m" together with the bias force correction signal F(b) to be applied to a digital-to-analog converter in the controller 37. The D/A converter 58 converts the sum of the discrete elements in the arrays Y[m,n] and F[b] to an analog misposition error correction signal E which is then supplied to the servo control circuitry 37. In this case the array index "n" of Y[m,n] is related to the circumferential position of the data transducers on the spinning disk, while "m" represents the selected transducer. When the system operates in the track following mode, and the correction misposition signal $E_m$ and Bias Force correction signal F(b) are present, control circuitry in the disk system performs a read/write operation with the storage data segments on the disk.

The foregoing illustrates only a single embodiment of my invention. Other embodiments also may be constructed without departing from the spirit of the invention. Particularly, those embodiments might vary in the order of signal processing and/or the order of applying the control signals to the servo system. Some components may be eliminated and still achieve the substance of the invention. For example, the temperature and error rate sensors are optional; likewise, low-pass filtering the servo signal is optional. Also, the misposition error correction method and the bias force error correction method may be used disjunctively or conjunctively. In that regard, I seek a patent covering the teachings of my invention embraced by the claims appended hereto, rather than the specific illustrative embodiment shown and described herein.

What is claimed as new and desired to be secured by Letters Patent of the United States is:

1. A method for correcting positioning errors in a servo positioning system of a magnetic disk storage device including a magnetic disk storage medium having a plurality of data tracks located on concentric data track centerlines and at least one position-reference track by which distance from a data track centerline can be measured, drive means for rotating said disk medium, transducer means for transferring data to and from said disk medium, a movable transducer carriage for positioning said transducer means over a selectable data track centerline, actuator means connected to said transducer carriage for moving said carriage, and control means for controlling said actuator means and including means responsive to a servo positioning signal and a misposition correction signal E for maintaining said transducer means over a selectable data track centerline, which method comprises the steps of:

A. positioning said transducer means over said position-reference track,

B. measuring, during rotation of the disk medium, the position error as the difference between the radial position of said transducer means and the centerline position of said position-reference track when said transducer means is positioned over said position-reference track thereby to generate a cyclic position-error signal X, C. digitizing the position-error signal X for any number of N circumferential positions about the position-reference track and combining it with any misposition correction signal applied during the measuring step thereby to generate an array X[n] of N digital position-error samples $X_n$, D. transforming said position-error samples X[n] by a digital filter whose impulse response h(n) includes an adjustable fundamental-frequency gain term $A_{FF}$, an adjustable offset gain term $A_{DC}$, and an adjustable phase lead term $\phi_h$ thereby to produce a misposition correction signal E that matches the response characteristics of the servo positioning system, E. iterating k times steps B through D, for any integer k equal to or greater than one, while applying the correction signal E produced during the previous iteration to said control means in a fashion to correct the previously measured position-errors when measuring a subsequent position-error in step B thereby to produce said misposition correction signal E that converges to a desired magnitude and phase, and F. positioning said transducer means over a selected data track and, while transferring data with the disk medium, applying said correction signal E to said control means thereby to correct position-errors.

2. A method as recited in claim 1 wherein the transforming of step D is performed by a matched digital filter whose impulse response h(n) is:

$$h(n) = \frac{A_{FF} \cdot 2 \cdot \cos}{N}\left[\frac{2\pi n}{N} + \phi_h\right] + \frac{A_{DC}}{N}$$

for n equal 1 to N, where $A_{FF}$ is non-zero.

3. A method as recited in claim 1 or 2 wherein the measuring of step B is performed through an anti-aliasing analog filter.

4. A method as recited in claim 1 or 2 wherein step C further includes the steps of:
  ii. extracting from the position-error samples X[n] to the selected fourier series components to be subsequently corrected, and
  iii. removing selectable harmonic components of X[n].

5. A method as recited in claim 4 wherein step D further includes transforming the position-error samples X[n] by a digital filter that additionally includes independently adjustable gain and phase lead terms for each of said selectable harmonic components.

6. A method as recited in claim 4 wherein step B includes measuring the position-error through an anti-aliasing analog filter.

7. A method as recited in claim 4 wherein step B includes averaging the measured position-error signal X over several revolutions of the disk medium.

8. A method as recited in claim 4 wherein said transducer means includes a plurality of transducers, each of which is associated with a plurality of data tracks, and said disk medium includes at least one position measurement or reference track for each transducer, which method further includes repeating steps A through E for each transducer thereby to produce a misposition correction signal E associated with each said transducer, and in step F, when performing a data transfer operation with a selected data track, applying to the control means the position-error correction signal E associated with the transducer with which said selected data track is associated thereby to correct position-errors associated with said transducer.

9. In a transducer position system of a magnetic disk storage device including a disk medium for storing data, said disk medium including a plurality of data tracks located on concentric data track centerlines on a surface of the disk medium, at least one data track including embedded servo information from which track offsets can be measured, drive means for rotating said disk medium, transducer means for transferring data with said disk medium, movable carriage means supporting said transducer means for moving said transducer means over a selectable data track centerline of said disk medium, and servo control means responsive to a servo positioning-error signal and a misposition correction signal E for controlling said carriage means thereby to maintain said transducer means over a selectable data track centerline, said control means comprising:

A. servo positioning means responsive to the difference between the position of said transducer means and the transducing position of said transducer means with respect to a selected data track centerline for producing said servo position-error signal, and B. misposition correction means for producing a misposition correction signal E including
  i. misposition measuring means for producing a misposition error signal X indicative of the misalignment when said transducer is positioned over the data track centerline which includes said servo information,
  ii. means for selectively removing harmonic components of the fundamental frequency of the position-error signal X,
  iii. means for digitizing the position-error signal X at a plurality of discrete circumferential locations N about said position reference or measurement track thereby to produce an array X[n] of digital position-error samples $X_n$, and
  iv. transformation means having an impulse response h(n) for transforming the position-error samples X[n] by a digital filter whose transfer function h(n) includes an adjustable fundamental-frequency gain term $A_{FF}$, an adjustable offset gain term $A_{DC}$, or an adjustable phase lead term $\phi_h$ thereby to produce a misposition correction signal E that matches the response characteristics of the servo positioning system and the position-error measurement apparatus.

10. The invention as recited in claim 9 wherein said misposition measuring means
  v. repeatedly measures the misposition while the servo control means responds to the misposition correction signal E, said misposition correction signal E thereby converging to a desired magnitude and phase.

11. The invention as recited in claim 10 wherein the misposition measuring means further includes an anti-aliasing analog filter for filtering the misposition error signal.

12. The invention as recited in claim 11 wherein the magnetic disk storage device includes a plurality of transducers, each transducer being associated with a plurality of data tracks and including at least one position-reference track, said misposition measuring means producing a misposition correction signal E associated with each said transducer, and said control means includes means responsive to a selectable misposition correction signal E corresponding to the transducer with which said selected data track centerline is associated.

13. The invention as recited in claim 12 wherein said misposition measuring means further includes means for averaging the measured position-error over a plurality of revolutions of the disk medium.

14. The invention as recited in claims 9, 10, 11, 12 or 13 wherein the transfer function h(n) of said transformation means is:

$$h(n) = \frac{A_{FF} \cdot 2 \cdot \cos}{N}\left[\frac{2\pi(n-1)}{N} - \phi_h\right] + \frac{A_{DC}}{N}$$

15. A method for correcting positioning errors in a servo positioning system of a magnetic disk storage device including a magnetic disk storage medium having a plurality of data tracks located on concentric data track centerlines and at least one reference track by which distance from a data track centerline can be measured, drive means for rotating said disk medium, transducer means for transferring data to and from said disk medium, a movable transducer carriage for positioning said transducer means over a selectable data track centerline, actuator means connected to said transducer carriage for moving said carriage, and control means for controlling said actuator means and including means responsive to a servo positioning signal and a misposition correction signal E for maintaining said transducer means over a selectable data track centerline, which method comprises the steps of:

A. positioning said transducer means over said position-reference track,

B. measuring, during rotation of the disk medium, the position error as the difference between the radial position of said transducer means and the centerline position of said position-reference track when said transducer means is positioned over said position-reference track thereby to generate a cyclic position-error signal X, C. digitizing the position-error signal X for any number of N circumferential positions about the position-reference track and combining it with any misposition correction signal applied during the measuring step thereby to generate an array X[n] of N digital position-error samples $X_n$, D. transforming said position-error samples X[n] by a digital filter that reduces the relative contributions of the higher frequency components in X[n] thereby to produce a misposition correction signal E, E. iterating k times steps B through D, for any integer k equal to or greater than one, while applying the correction signal E to said control means in a fashion to correct the previously measured position-errors when measuring a subsequent position-error in step B thereby to produce said misposition correction signal E that converges to a desired magnitude and phase, and F. positioning said transducer means over a selected data track and, while transferring data with the disk medium, applying said correction signal E to said control means thereby to correct position-errors.

16. A method as recited in claim 15 wherein the transforming of step D is performed by a matched digital filter whose impulse response h(n) is:

$$h(n) = \frac{A_{FF} \cdot 2 \cdot \cos}{N}\left[\frac{2\pi n}{N} + \phi_h\right] + \frac{A_{DC}}{N}$$

for n equal 1 to N, where $A_{FF}$ is non-zero.

17. A method as recited in claim 15 wherein the measuring of step B is performed through an anti-aliasing analog filter.

18. A method as recited in claim 15 wherein step B includes averaging the measured position-error signal X over several revolutions of the disk medium.

19. A method as recited in claim 15 wherein said transducer means includes a plurality of transducers, each of which is associated with a plurality of data tracks, and said disk medium includes at least one position measurement or reference track for each transducer, which method further includes repeating steps A through E for each transducer thereby to produce a misposition correction signal E associated with each said transducer, and in step F, when performing a data transfer operation with a selected data track, applying to the control means the position-error correction signal E associated with the transducer with which said selected data track is associated thereby to correct position-errors associated with said transducer.

* * * * *